United States Patent [19]

Gallizio et al.

[11] 4,283,830
[45] Aug. 18, 1981

[54] METHOD AND APPARATUS OF MONITORING THE SCREWING HOME OF A THREADED ELEMENT BY A POWER TOOL

[75] Inventors: Gabriele Gallizio, Turin; Giovanni Balestrino, Orbassano, both of Italy

[73] Assignee: Centro Richerche Fiat S.p.A., Orbassano, Italy

[21] Appl. No.: 47,965

[22] Filed: Jun. 12, 1979

[30] Foreign Application Priority Data

Sep. 27, 1978 [IT] Italy .............................. 69226 A/78

[51] Int. Cl.³ ............................................. B25B 23/14
[52] U.S. Cl. ...................................... 29/407; 29/240; 73/12
[58] Field of Search ..................... 29/407, 526 R, 240; 144/32 R; 173/12

[56] References Cited

U.S. PATENT DOCUMENTS

| | | |
|---|---|---|
| 3,696,871 | 10/1972 | Stenbacka .............................. 173/12 |
| 4,027,530 | 6/1977 | Tambini et al. ......................... 173/12 |
| 4,176,436 | 12/1979 | McCombs et al. ..................... 29/407 |

Primary Examiner—Lowell A. Larson
Attorney, Agent, or Firm—Sughrue, Rothwell, Mion, Zinn and Macpeak

[57] ABSTRACT

In order to determine whether the screwing home of a threaded element, such as a screw, by a power tool has been acceptably executed, the number of revolutions undergone by the threaded element during the screwing operation is measured as a function of time. The revolution-time function derived for the screwing operation is compared with a reference function corresponding to an acceptable screwing operation. The comparison shows up unacceptable screwing operations and can be performed both visually and by a microcomputer. Apparatus for effecting such monitoring of screwing operations includes sensing means for measuring rotation of the output shaft of the power tool and circuit means for processing the output of the sensing means and effecting the comparison with the reference function.

8 Claims, 6 Drawing Figures

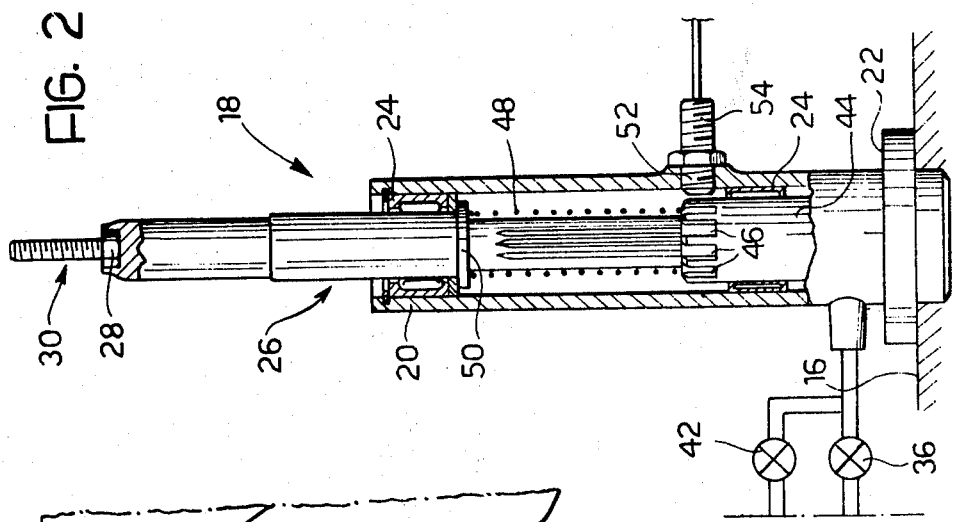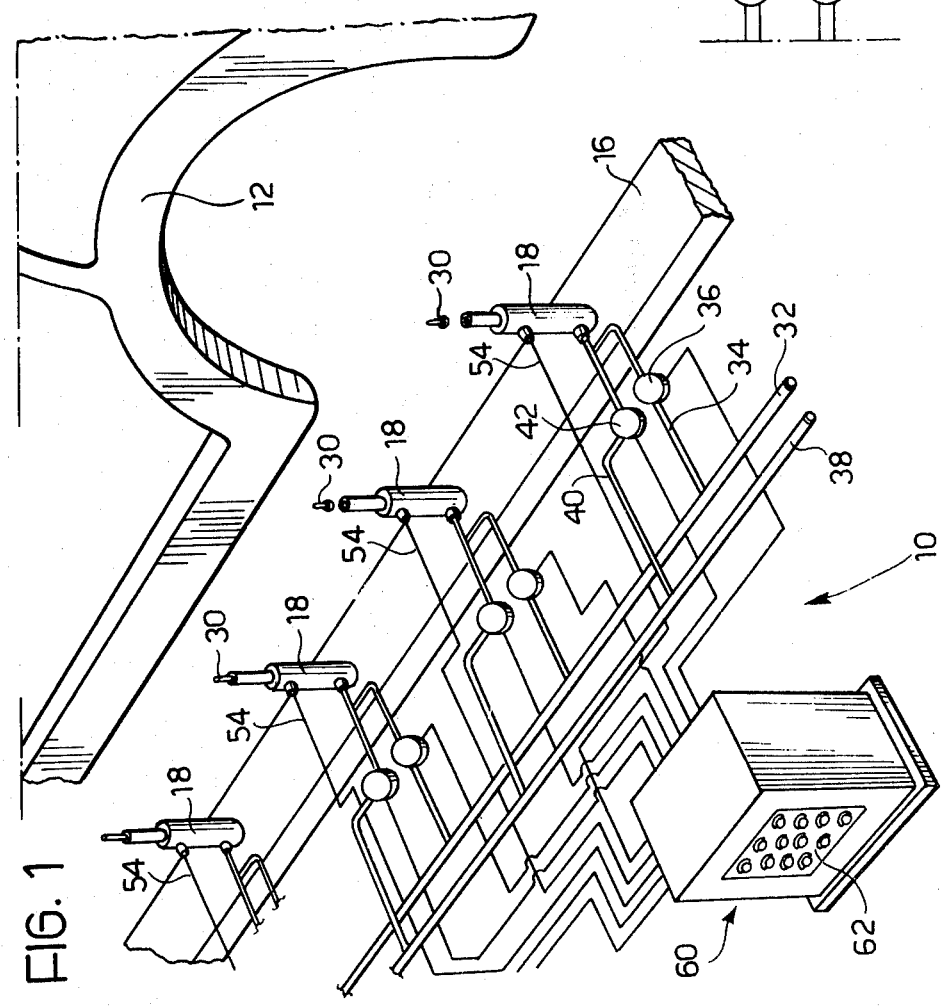

METHOD AND APPARATUS OF MONITORING THE SCREWING HOME OF A THREADED ELEMENT BY A POWER TOOL

The present invention relates to methods and apparatus for monitoring the screwing home of a threaded element by a power tool such as a screw driver used to screw in screws.

Power screw drivers have been widely used for some time for tightening screws, bolts, and nuts in metal work structures and in mass-produced mechanical constructions, particularly in the motor-car industry. These power screw drivers are normally provided with a pneumatic or electric motor and make it possible to appreciably reduce the time necessary for the screwing operations with respect to manual screwing. However, their use does not appreciably reduce human involvement. In fact, these power screw drivers do not give a sufficiently high level of reliability in carrying out a screwing operation so that at the end of each screwing operation, the screwed on components have to be inspected visually, for the puspose of detecting any faults in the screwing operations. A further, manual inspection using dynamometric keys may also be required to check that the screws have been tightened to the correct value of torque.

These inspection operations involve long stoppages and consequently long periods of wasted time.

This disadvantage is particularly serious where the power screw drivers are provided at a work station along an assembly line to simultaneously screw in a large number of threaded elements into the mechanical parts being assembled.

It is therefore an object of the present invention to provide a method of monitoring the screwing home of a threaded element by a power tool, which makes it possible to avoid the above said disadvantage, by arranging for unsatisfactory screwing operations to be detected in a completely automatic manner.

It is a further object of the invention to provide apparatus for carrying out automatic monitoring of screwing operations effected by a power tool.

According to one aspect of the invention, there is provided a method of monitoring the screwing home of a threaded element by a power tool, the method comprising the steps of:

measuring as a function of time the number of revolutions made by the threaded element during the operation of screwing home the element whereby to derive a measured revolution-time function for the screwing operation, and comparing the measured revolution-time function with a reference function to determine the acceptability of execution of the screwing operation.

The comparison of the measured and reference functions preferably involves the representation of the functions in diagram form for visual inspection.

The generation of a visual representation of the measured number of revolutions as a function of time is advantageous in that an immediate visual indication of any faulty screwing operations is obtained and this enables human involvement in the checking process to be reduced. Use of the monitoring method ensures a greater overall reliability in the operation of the power tool and a greater consistency in the quality of the screwing.

Preferably the said step of comparison comprises the subdivision of the duration of the screwing operation into a plurality of intervals, for example of equal lengths of time, and the verification of whether the number of revolutions made by the threaded element at the end of each time interval lies between two suitable threshold values corresponding to a maximum and a minimum admissible number of revolutions.

Such a comparison makes it possible to detect faulty screwing operations related to the failure of the screw to enter into the corresponding. tapped seat. Advantageously, the comparison step also involves checking that between the ends of the last two time intervals into which the screwing operation is divided, there is no change in the number of revolutions effected by the threaded element. In this manner it is possible to verify that the threaded element is fully screwed in.

According to another aspect of the invention, there is provided apparatus for monitoring the screwing home of a threaded element by a power tool, the apparatus comprising sensing means responsive to rotation of the output shaft of the power tool to output an electrical signal indicative of the angular magnitude of that rotation, and electronic circuit means arranged to receive and process the output signal from the sensing means to derive therefrom the number of revolutions executed by the said shaft as a function of screwing time, the electronic circuit means including means for storing a reference revolution-time function and comparison means arranged to compare the derived revolution-time function with the reference function to determine the acceptability of execution of the screwing home operation carried out by the power tool.

A method according to the invention and apparatus embodying the invention, both for monitoring the screwing home of a screw by a power screw driver, will now be particularly described, by way of example, with reference to the accompanying diagrammatic drawings, in which:

FIG. 1 is a perspective view showing part of a screwing station of a vehicle assembly line, the station being provided with a plurality of power screw drivers and apparatus for controlling and monitoring the operation of the screw drivers;

FIG. 2 is a longitudinal section to an enlarged scale of one of the screw drivers shown in FIG. 1;

Figure 3:
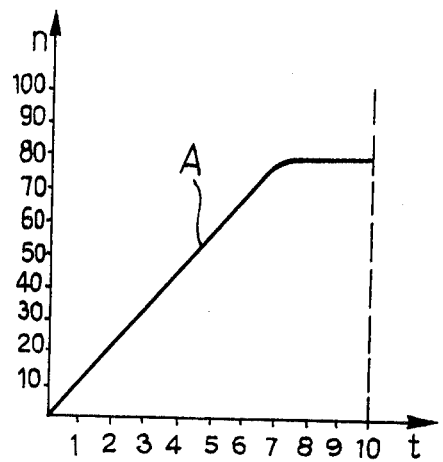
FIG. 3 is a diagram showing an "ideal" screwing curve for the screw driver shown in FIG. 2.

Shown in FIG. 1, is a work station on an assembly line for assembling mechanical parts of motor vehicles onto the vehicle bodies.

These mechanical parts, comprising engines, transmissions, suspensions, brakes, silencers etc. (not shown in the drawings) are arranged on pallets which arrive at the appropriate work stations of the assembly line at the same time as the vehicle bodies. The vehicle bodies are supplied to the work stations by means of an overhead conveyor of a known type, one such vehicle body 12 being shown diagrammatically in FIG. 1.

The work station 10 comprises a support base 16 from which a plurality of power screw drivers 18 extend vertically upwards. The actual geometric arrangement of the screw drivers 18 on the base 16 is of course determined by the type of vehicle which is being assembled.

The screw drivers 18 are pneumatically powered screw drivers of a type known per se. As shown in detail in FIG. 2, each screw driver 18 comprises a cylindrical casing 20 open at its upper end and provided at its lower end with an annular collar 22 by means of which the casing seats on the surface of the base 16.

A shaft 26 is rotatably mounted inside the casing 20 by means of radial needle bearings 24. The upper end of the shaft 26 extends through the casing 20 and is shaped to receive the head 28 of a screw 30 in such a manner that the screw 30 is fast for rotation with the shaft 26.

Inside the casing 20, the lower end portion of the shaft 26 is engageable via a clutch with a compressed air motor, not shown in the drawing. The compressed air motor is arranged to be supplied by a source of compressed air at low pressure (not shown) through a pipe 32 (FIG. 1) and a branch duct 34 provided with an electrovalve 36 (FIGS. 1 and 2). The compressed air motor is also arranged to be supplied from a source of air at high pressure (not shown) through a pipe 38 (FIG. 1) and a branch duct 40 provided with an electrovalve 42 (FIGS. 1 and 2).

The lower end portion of the shaft 26 is coupled to a cylindrical coupling member 44 interposed coaxially between the shaft 26 and the casing 20. The coupling member 44 is fast for rotation with the shaft 26 but is movable axially thereof. At its upper end the coupling 44 is externally provided with a plurality of channels 46 extending parallel to the axis of the member 44 and equi-angularly spaced around its circumference. In the example shown, there are eight channels 46.

A helical spring 48 coaxially surrounds the shaft 46 and reacts between the upper end face of the coupling member 44 and an annular collar 50 abutting against an annular shoulder of the shaft 26. The spring 48 is arranged to urge the shaft 26 axially upwards so that during use of the screw driver the free end of the screw 30 to be inserted into a tapped hole is held in contact with the mouth of the hole.

The casing 20 is provided with a radial hole 52 at the level of the channels 46 of the coupling member 44. The hole 52 serves to seat a magnetic detector designed to cooperate with the portion of the coupling member 44 provided with the channels 46, this portion forming a phonic wheel. The magnetic detector 54 therefore forms a sensor of the angular position of the shaft 26, and is arranged to provide an output in the form of a square wave electrical signal having a period corresponding to one eighth of a revolution of the shaft 26, and therefore of the screw 30 associated with this shaft 26.

The work station 10 further comprises screwing control and monitoring apparatus 60 electrically connected with the magnetic detectors 54 and with the electrovalves 36, 42 of the screw drivers 18.

The apparatus 60 includes a microcomputer which is connected to receive the electrical signals coming from the magnetic detectors 54 and which is operatively associated with a light panel 62. The panel 62 is provided with light indicators, the number of indicators being equal to the number of screw drivers 18 at the station 10.

The microcomputer can, for example, be of the type designated ULP 32 manufactured and marketed by the SEPA Company of Turin. This microcomputer comprises a central unit based on an INTEL 8080 microprocessor, memory cards of the RAM and EPROM type and various interface cards. The later incorporate optical isolators to safeguard the microcomputer in the hostile industrial environment.

For a screwing station 10 comprising 30 power screw drivers 18, the ULP 32 microcomputer comprises 4 K EPROM, 2 K RAM with buffer battery, 48 digital inputs, 112 digital outputs and 4 analogue inputs.

The operation of the work station 10 shown in FIG. 1 will now be described.

The parts which are to be assembled together which, as already stated, comprise in the present example mechanical components and vehicle bodies, are supplied simultaneously to the work station 10. These parts are arranged so that the positions of the screws 30 placed by hand in the ends of the shafts 26 of the screw drivers 18, correspond to the positions of tapped holes made in the mechanical parts and intended to receive the screws 30. When the parts to be assembled together are properly positioned, the screw driver shafts 26, under the urging of their respective springs 48, press the free ends of the screws 30 into contact with the mouths of the said tapped holes.

The operation of screwing home the screws 30 is now commenced.

Each screwing operation is divided into two phases. During the first phase air at low pressure (approximately 2 atmospheres) is supplied at the same time to the motors of all the screw drivers 18 by the simultaneous activation of the electrovalves 36. As a result, each screw 30 is screwed into its corresponding tapped hole until the head 28 of the screw 30 comes into contact with the surface of the component being secured by that screw.

In the second phase of the screwing operation, the pneumatic motors of the screw drivers 18 are supplied with air at high pressure, by means of the simultaneous activation of the electrovalves 42, so as to effect the tightening of the screws 30 with a predetermined value of torque.

At the same time as the screwing operation is being carried out, the microcomputer connected to the magnetic detectors 54 monitors the screwing operation effected by each screw driver 18 to assess its effectiveness. This monitoring involves the processing of the electrical signals coming from each detector 54 so as to generate, for each screw driver 18, a diagram with a curve plotting the number of revolutions of the screw driver shaft 26 (and therefore of the screw 30 associated with it) as a function of time; the curve thus generated is then compared with a reference curve.

The reference curve, which is applicable to the screwing together of the components mentioned above according to the method described, is indicated by A in FIG. 3 and can be considered as representing an ideal screwing operation; for the sake of simplicity, this curve will be referred to in the description as the "ideal" curve. This curve starts with a portion which has a constant gradient, continues with a small knee corresponding to the contact of the head 28 of a screw 30 with the surface of the component being secured, and ends with a horizontal portion corresponding to a period at the end of the screwing operation when the motor of the screw driver 18 is still pressurised but the screw 30 has ceased to rotate.

The main parameters of the curve, that is the gradient of the initial portion and the total number of revolutions achieved, vary from screw to screw but, for each type of screw, they involve similar time periods. The total number of revolutions achieved depends both on the type of screw and on the thickness of the component to be screwed; however, for a given screw type and component thickness this total number may be considered substantially constant and may be calculated by taking a statistical average over a certain number of measured values. The scatter around the average value is usually of the order of one revolution.

The gradient of the initial portion of the curve may be subject to gradual variations over long periods of the order of weeks, due to ageing of the motors of the screw driver 18. Furthermore, variations in gradient may also occur over time periods of a few hours, due to various causes, including fluctuations in the pressure supplying the pneumatic motors of the screw drivers 18.

The measurement of the parameters which characterise the curve, for example its gradient, is effected at intervals by carrying out a dummy screwing operation for each motor during the period when the assembled parts are moved on after the end of each real screwing operation. In this manner, the relevant parameters can be numerically measured a few minutes before each screwing operation which enables middle and long term fluctuations of these parameters to be followed.

Figure 4:
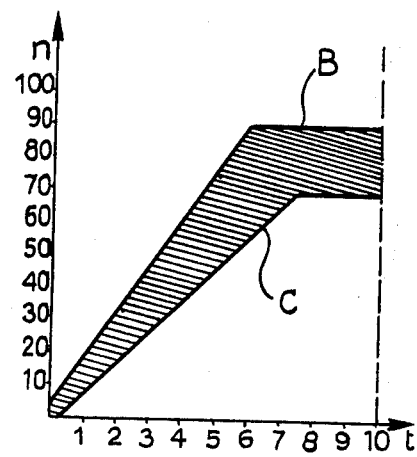
FIG. 4 is a diagram showing a range of admissible departures from the "ideal" screwing curve of FIG. 2.

FIG. 4 shows the range of variations permissible for the curve plotting the function (number of revolutions/time) for each screw driver 18 during a screwing operation; this curve will, for the sake of simplicity, be called the "real" curve. This range of permissible variations is delimited by two extreme curves, B and C which are positioned respectively above and below the ideal curve A. Each curve B and C has an inclined position of constant gradient followed by a horizontal portion.

Figure 5:
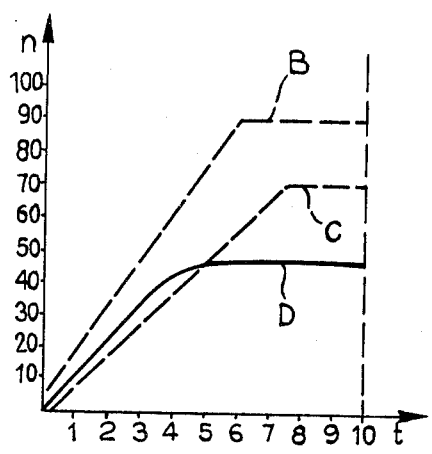
FIGS. 5 and 6 are diagrams showing curves representing unacceptable screwing operations.
Figure 6:
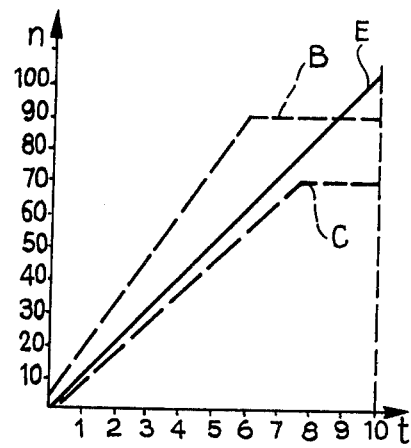

FIGS. 5 and 6 show two different curves each corresponding to a particular form of unacceptable screwing operation which may be shown up during the comparison between the "real" curve generated by the microcomputer during a screwing operation and the "ideal" curve A.

In the first case, (FIG. 5), the real curve, indicated by D, has an initial inclined portion with a constant gradient which runs into a horizontal portion which crosses the lower extreme curve C. Such a curve D indicates that the screw 30 has seized during the phase of screwing at low pressure.

In the second case (FIG. 6) the real curve, indicated by E, comprises a line inclined at a constant gradient which crosses the upper extreme curve B. Such a curve indicates a failure of the screw 30 to enter into the corresponding seat intended to receive it.

In order to improve the accuracy of monitoring, the time taken to carry out a screwing operation is subdivided into 10 equal intervals at the end of each of which the number of revolutions effected up to that moment by the screw 30 is compared with the maximum and minimum values predetermined by the extreme curves B and C. In this manner it is possible to determine the cause and the moment at which a problem occurs during a screwing operation.

For a screwing operation to be assessed as having been satisfactorily executed, at the end of each time interval the number of revolutions effected by the screw must lie within the range of variations delimited by the extreme curves B, C. The situation may arise, however, in which the screw, though satisfying the preceding condition, is not completely firm at the end of the screwing operation. The microcomputer is therefore arranged to verify that the number of revolutions effected by the screw at the end of the last time interval of the screwing operation is equal to the number of revolutions of the screw at the end of the penultimate time interval. In this manner it is possible to establish with certainty whether screwing in of the screw has been completed.

Final tightening of the screw involves rotation of the screw during the phase of screwing at high pressure. Failure to achieve such final tightening may be caused by failure of the electrovalve 42 or by seizure of the screw at the end of the low pressure screwing phase. In order to assess whether the screw has been properly tightened, the microcomputer is arranged to verify that during the high pressure screwing phase the output of the corresponding magnetic detector 54 indicates a turning of the screw through a fraction of a revolution. In the present example, this fraction must be equal to at least a sixteenth of a revolution.

To summarize, the microcomputer is arranged to detect any anomalies in screwing due to seizure of the screw during the low-pressure screwing phase, to failure of the screw to enter into a tapped hole, to failed tightening at the end of the high pressure screwing phase, or to blockage of the screw at the beginning of the high-pressure phase.

The light panel 62 associated with the microcomputer is arranged to indicate, at the end of the monitoring, the position of any screwing operation assessed as unacceptable. This makes it possible to locate immediately these unacceptable screwings and thereby minimise human involvement in the latter, which form on average 10% of the total number of screwing operations carried out.

Printing apparatus (not shown) can be associated with the microcomputer to enable visual examination of the comparison made between the ideal curve and the real curve for each screw driver at the end of each screwing operation. Such a visual examination makes it possible to ascertain the causes of any failures.

The screwing station previously described is provided with an autodiagnostic system based on a series of software modules stored in the memory of the microcomputer. This system enables the apparatus 60 to indicate, during the screwing operations, any breakdown at the screwing station 10, such as for example failure of the magnetic detectors 54, of the low pressure electrovalves 36 or of the high pressure electrovalves 42. For example, the pressure present in the low pressure electrovalves 36 is continuously measured by means of pressure gauges and analogue to digital convertors whose outputs are checked by the microcomputer.

The screwing station 10 may be associated, in the case of large scale mass production, with similar units arranged along the production line. In this case, the microcomputers associated with each screwing station may be connected to a central managing processor, of the same type previously described, for the purpose of obtaining comprehensive data regarding the screwing operations effected at the various screwing stations.

Although the described monitoring method and apparatus have been concerned with the screwing home of screws using power screw drivers, it will be appreciated that they can be readily adapted to monitor the screwing home of any threaded element (for example a nut or bolt) by an appropriate power tool.

I claim:

1. A method of monitoring the screwing home of a threaded element by a power tool, the method comprising the steps of:
measuring the number of revolutions made by the threaded element during the operation of screwing home the element,
subdividing the duration of the screwing operation into a plurality of intervals, and
verifying that the number of revolutions made by the threaded element from the beginning of the screwing operation up to the end of each time interval lies between two threshold values respectively corresponding to a maximum and a minimum number of revolutions acceptable at that stage during the screwing operation.

2. A method according to claim 1 including the step of verifying that the number of revolutions undergone by the threaded element at the end of the last time interval into which the screwing operation is subdivided is equal to the number of revolutions of the threaded element at the end of the penultimate time interval.

3. A method according to claim 1 or 2, in which the power tool has a pneumatic motor and the operation of screwing home the threaded element comprises a first phase in which the power tool is supplied with air at low pressure and a second phase in which the power tool is supplied with air at high pressure, the method further comprising the step of verifying that the threaded element is turned during the high-pressure phase of the screwing operation through at least a fraction of a revolution.

4. A method according to claim 1, in which the two threshold values are computed by measuring the number of revolutions made by the power tool during a dummy screwing operation effected prior to the beginning of the actual screwing operation.

5. A method according to claim 1, in which the step of subdividing the duration of the screwing operation into a plurality of intervals and verifying that the number of revolutions made by the threaded element lies between the said two threshold values involves the representation of the said threshold values and of the said number of revolution in diagram form for visual inspection.

6. Apparatus for monitoring the screwing home of a threaded element by a power tool, the apparatus comprising sensing means responsive to rotation of the output shaft of the power tool to output an electrical signal indicative of the angular magnitude of that rotation, and electronic circuit means arranged to receive the process the output to derive therefrom the number of revolutions executed by the said shaft during the operation of screwing home the threaded element, the electronic circuit means including means for subdividing the duration of the screwing operation into a plurality of intervals, means for storing two threshold values respectively corresponding to a maximum and a minimum number of revolutions acceptable at the end of each time interval during the screwing operation, and comparison means arranged for verifying that the number of revolutions made by the said shaft form the beginning of the screwing operation up to the end of each time interval lies between the said two threshold values.

7. Apparatus according to claim 6, in which the electronic circuit means is arranged to produce a diagrammatic representation of the said threshold values and of said derived number of revolutions.

8. A work station comprising a plurality of pneumatic power tools arranged to be supplied through controllable electro-valves with air under pressure to effect the simultaneous screwing home of a plurality of identical threaded elements, and monitoring apparatus in accordance with claims 6 or 7, said electronic circuit means of the apparatus being provided with an indicator light panel arranged to indicate the position of a screwing operation determined by the electronic circuit means as being unacceptable.

* * * * *